(12) United States Patent
Benavidez et al.

(10) Patent No.: US 10,452,769 B1
(45) Date of Patent: Oct. 22, 2019

(54) CONCURRENT DISPLAY OF APPLICATION BETWEEN DEVICES

(71) Applicant: United Services Automobile Association (USAA), San Antonio, TX (US)

(72) Inventors: Andy Benavidez, San Antonio, TX (US); Heather Thomas, San Antonio, TX (US); Ryan Springer, San Antonio, TX (US); Mark Paxman Warnick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 19 days.

(21) Appl. No.: 14/294,912

(22) Filed: Jun. 3, 2014

Related U.S. Application Data (63) Continuation-in-part of application No. 13/826,262, filed on Mar. 14, 2013.

(60) Provisional application No. 61/696,024, filed on Aug. 31, 2012.

(51) Int. Cl.
| | |
|---|---|
| *G06F 17/24* | (2006.01) |
| *H04L 29/06* | (2006.01) |
| *H04L 12/24* | (2006.01) |
| *G06F 3/0482* | (2013.01) |
| *H04L 12/26* | (2006.01) |

(52) U.S. Cl.
CPC .......... *G06F 17/241* (2013.01); *G06F 3/0482* (2013.01); *H04L 41/22* (2013.01); *H04L 43/10* (2013.01); *H04L 65/4007* (2013.01)

(58) Field of Classification Search
CPC ...................................................... G06F 15/16
See application file for complete search history.

(56) References Cited

U.S. PATENT DOCUMENTS

| | | | |
|---|---|---|---|
| 6,321,252 B1 | 11/2001 | Bhola | |
| 7,356,563 B1* | 4/2008 | Leichtling | G06Q 10/06 345/2.1 |
| 7,996,549 B2 | 8/2011 | Ryman | |
| 8,239,773 B1 | 8/2012 | Billman | |
| 8,484,745 B2* | 7/2013 | Bank | G06Q 10/00 715/751 |
| 8,682,977 B1 | 3/2014 | Roy | |
| 9,166,882 B1 | 10/2015 | Hill | |
| 9,706,241 B2 | 7/2017 | Felt | |
| 2001/0044751 A1 | 11/2001 | Pugliese et al. | |
| 2002/0029350 A1 | 3/2002 | Cooper | |

(Continued)

*Primary Examiner* — Kevin T Bates
*Assistant Examiner* — Ronak Patel
(74) *Attorney, Agent, or Firm* — Fish & Richardson P.C.

(57) ABSTRACT

Methods, systems, and apparatus, including computer programs encoded on computer storage media, for concurrent display of applications between devices. One of the methods includes establishing full duplex communication session with a first application on a first computing device using a second application. The method includes receiving a user interface image from the first application on the first computing device. The method includes displaying the user interface image on a second user interface of the computer system. The method includes generating an overlay image including one or more annotations to the user interface image. The method also includes sending the overlay image to the first computing device.

17 Claims, 6 Drawing Sheets

(56) References Cited

U.S. PATENT DOCUMENTS

| | | |
|---|---|---|
| 2002/0101853 A1 | 8/2002 | Siegrist et al. |
| 2003/0097448 A1 | 5/2003 | Menezes |
| 2004/0008728 A1 | 1/2004 | Lee |
| 2004/0015729 A1* | 1/2004 | Elms ............... G06F 21/83 726/34 |
| 2004/0133668 A1 | 7/2004 | Nicholas, III |
| 2005/0021626 A1 | 1/2005 | Prajapat et al. |
| 2005/0039133 A1* | 2/2005 | Wells ............... G06Q 10/10 715/740 |
| 2005/0073575 A1* | 4/2005 | Thacher ............ H04N 7/141 348/14.13 |
| 2005/0111399 A1 | 5/2005 | Sapienza et al. |
| 2005/0165834 A1 | 7/2005 | Nadeau |
| 2005/0246422 A1 | 11/2005 | Laning |
| 2006/0009215 A1 | 1/2006 | Bogod |
| 2006/0129816 A1 | 6/2006 | Hinton |
| 2006/0130135 A1 | 6/2006 | Krstulich |
| 2007/0188450 A1* | 8/2007 | Hernandez ......... G06F 1/1626 345/158 |
| 2009/0033679 A1* | 2/2009 | Borrel ............... G06T 15/20 345/629 |
| 2009/0164581 A1 | 6/2009 | Bove |
| 2009/0182643 A1 | 7/2009 | Holstein |
| 2010/0017695 A1 | 1/2010 | Palmieri |
| 2010/0042583 A1* | 2/2010 | Gervais ............. G06Q 40/08 707/757 |
| 2010/0274848 A1 | 10/2010 | Altmaier |
| 2011/0247045 A1 | 10/2011 | Rajagopal et al. |
| 2011/0265177 A1* | 10/2011 | Sokolan ............ G06F 21/6227 726/19 |
| 2011/0320277 A1 | 12/2011 | Isaacs |
| 2012/0001832 A1* | 1/2012 | Braghis ............. G06F 3/1454 345/2.2 |
| 2012/0084735 A1* | 4/2012 | Sirpal ............... G06F 1/1616 715/863 |
| 2012/0158531 A1* | 6/2012 | Dion ................. G06Q 10/10 705/26.1 |
| 2012/0210242 A1 | 8/2012 | Burckart |
| 2012/0223884 A1* | 9/2012 | Bi .................... G06F 1/1694 345/158 |
| 2013/0019306 A1* | 1/2013 | Lagar-Cavilla ...... G06F 21/566 726/22 |
| 2013/0038632 A1* | 2/2013 | Dillavou ............ G06F 3/1431 345/633 |
| 2013/0050120 A1* | 2/2013 | Takahashi .......... G06F 3/017 345/173 |
| 2013/0103834 A1 | 4/2013 | Dzerve |
| 2013/0297933 A1 | 11/2013 | Fiducia |
| 2013/0307796 A1 | 11/2013 | Liu |
| 2013/0307870 A1* | 11/2013 | Ashbrook .......... G06F 21/84 345/629 |
| 2014/0040767 A1* | 2/2014 | Bolia ................ G06F 3/1454 715/751 |
| 2014/0088983 A1 | 3/2014 | Neff |
| 2016/0344819 A1 | 11/2016 | Beveridge |

* cited by examiner

CONCURRENT DISPLAY OF APPLICATION BETWEEN DEVICES

CROSS-REFERENCE TO RELATED APPLICATIONS

This application is a continuation-in-part-of and claims priority to U.S. application Ser. No. 13/826,262 filed on Mar. 14, 2013 entitled "CONCURRENT DISPLAY OF APPLICATIONS BETWEEN DEVICES," which in turn claims priority to U.S. Provisional Application No. 61/696,024, filed Aug. 31, 2012, the entire contents of each of which are hereby incorporated by reference.

TECHNICAL FIELD

The present disclosure relates to methods and systems for concurrent display of applications between devices.

BACKGROUND

The increasingly capabilities of mobile devices, such as wireless access to the Internet, has provided access to information into the mainstream of everyday life. In many situations, a mobile device can have applications pre-installed on the device and/or downloaded to the device. An application can, for example, include computer software (e.g., instructions) developed for a mobile device to assist a user in performing a particular task.

SUMMARY OF THE INVENTION

In general, one innovative aspect of the subject matter described in this specification can be embodied in methods that include the actions of establishing full duplex communication session with a first application on a first computing device using a second application; receiving, by a computer system, a user interface image from the first application on the first computing device. The method includes the actions of displaying the user interface image on a second user interface of the computer system. The method includes the actions of generating an overlay image including one or more annotations to the user interface image; and sending the overlay image to the first computing device.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may include the actions of polling the first computing device to request an updated image. The methods may include the actions of receiving an updated image in response to a change in the user interface. The user interface image may omit sensitive information. The methods may include the actions of sending a list of sensitive information to the first computing device. Establishing the full duplex communication may include establishing a WebSockets session. The methods may include the actions of displaying the overlay image over a user interface. The methods may include the actions of sending, by the first computing device, an updated user interface image in response to a change in the orientation of the first computing device. The methods may include the actions of identifying a portion of the user interface including sensitive information, and obfuscating the sensitive information in the user interface image. Identifying the portion of the user interface including sensitive information may include comparing fields on the user interface to a list of fields including sensitive information.

DETAILED DESCRIPTION

The present disclosure provides method and system embodiments for concurrent display of applications between devices. For example, concurrent display of an application between a first computing device and a second computing device can include co-browsing of an application on a mobile device and a stationary device using a wireless network communication.

Applications on computing devices, such as a mobile device, can assist a user of the device in performing a particular task. A mobile device, as used herein, can include a mobile cellular telephone, a tablet, a mobile personal computer, and a personal digital assistant (PDA), among other mobile devices. The applications can include user interfaces for a user to interact with the application on the mobile device. For instance, applications can be used to check a weather forecast, conduct financial transactions, and make a purchase, among many other tasks.

A user interface can, for example, include a space where interactions between a user and a computing device occur (e.g., allows a user to interact with a computing device using images and/or text). A user interface can include hardware components and computer instruction components. For instance, hardware components can include input components (e.g., a mouse, a touch screen, and a keyboard) and output components for the computing device to indicate the effects of user input (e.g., display). An example user interface can include a graphical user interface (GUI). A GUI can, for example, represent actions and tasks available to a user through graphical icons and visual indicators.

In some instances, due to the increasing capabilities of mobile devices and associated applications, a user may desire end-user support for assistance with an application. An end-user can include a customer service representative (CSR) and/or technical support personnel, for example. It can be beneficial for an end-user to control the display of the application on the mobile device to assist the user. However, control provided to the end-user can result in an end-user having access to personal information on a user's mobile device. Further, end-user control of mobile device can be difficult due to the wireless data communication protocol used by some mobile devices, the wide variety of operating systems, and/or instruction language used by many mobile devices.

Concurrent display of an application between devices, in accordance with some embodiments of the present disclosure, can allow control and/or access of an application on a first computing device to a user on a second computing device. The control and/or access to the first computing device can, for instance, be limited to the application. For example, in response to a request from a user on the first computing device, a second computing device can receive application display data to emulate a session of the first application in the second computing device.

Figure 1:
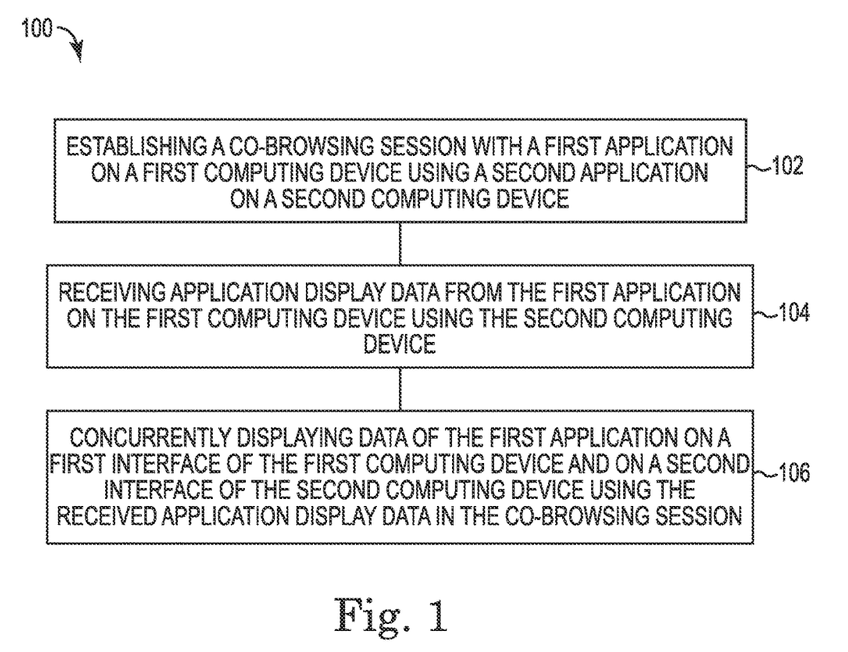
FIG. 1 illustrates a block diagram of an example method for concurrent display of an application between devices according to one or more embodiments of the present disclosure.

FIG. 1 illustrates a block diagram of an example method 100 for concurrent display of an application between devices according to one or more embodiments of the present disclosure. At block 102, the method 100 can include establishing a co-browsing session with a first application on a first computing device using a second application on a second computing device. A co-browsing session can, for example, include a connection between two or more devices allowing joint (e.g., concurrent) navigation through the first application.

A first computing device, as used herein, can include a mobile device. For instance, a mobile device can include a mobile cellular telephone, a tablet personal computer, a mobile personal computer, and/or a PDA, among other mobile devices.

A first application can include a native application to the first computing device, for example. A native application, as used herein, can include an application designed, developed, and/or created for use on a specific computing environment (e.g., computer language and/or operating system). The native application can be pre-installed on the first computing device and/or downloaded to the first computing device, for instance.

As used herein, a second computing device can include a stationary device. A stationary device can include a computing device is not mobile and/or is capable of being mobile but is used and/or operated in a stationary location. For example, a stationary device can include a desktop computer.

In accordance with some embodiments of the present disclosure, establishing a co-browsing session with a first application on a first computing device using a second application can be initiated upon a request from the first application on the first computing device. For instance, a user using the first computing device (e.g., a first user), can make an indication in the first application to initiate a co-browsing session. The indication can include selecting, clicking, and/or highlighting a button and/or link on a user interface of the first application and/or interacting with a display of the first computing device (e.g. first display). A user interface, as used herein, can include a GUI.

In response to an indication from the first user, the first application can send a request for a co-browsing session to the second computing device over a network, for example. The network can, for instance, include a wireless network.

In various embodiments of the present disclosure, a request for a co-browsing session from the first application can be wirelessly transmitted to a wireless access point of a wireless network. The wireless network can be interconnected to the Internet and/or a physical network. A physical network can include a computer telephony integration (CTI) system and/or a plurality of computing devices. A CTI, as used herein, can refer to a combination of technologies and processes that enable or provide the integration and coordination of voice and data communications.

For instance, the request can be routed by the CTI system to a second computing device. The second computing device can, for example, be used by a predetermined CSR. The second computing device, associated with the CSR, can be assigned an Internet Protocol (IP) address. The assigned IP address can, for instance, be used as an identifier to re-establish a co-browsing session in the event that the first computing device re-establishes its connection as a result of a termination event that disconnects the co-browsing session.

In accordance with some embodiments of the present disclosure, the second computing device (e.g., the device associated with the CSR and a stationary device) can query the first application implemented on the first computing device to receive (e.g., collect) configuration information related to the first computing device. Configuration information, as used herein, can include device configuration data (e.g., device configuration data and/or first computing device configuration data). Device configuration data can include, but is not limited to, a unique identifier of the first computing device, the first computing device's hardware configuration, the network communication protocol being used, and a session number, among other data and/or information. The collected configuration data can be stored for later use to re-establish a co-browsing session if the connection with the first computing device is lost (e.g., terminated unintentionally, accidentally, and/or because of an error). The configuration data received from the first application can be queried in response to a received request for the co-browsing session from the first computing device and/or can be used to establish a co-browsing session.

The first computing device can, in accordance with one or more embodiments of the present disclosure, be in transit and the session number and/or a unique identifier can be used by the second application on the second computing device to maintain the co-browsing session as the first computing device transitions from wireless access point A to wireless access point B. If the first computing device loses its connection, the first application on the first computing device can provide the unique identifier of the first computing device to the second application on the second computing device and/or the CTI system. The unique identifier can, for instance, include an International Mobile Equipment Identity (IMEI) number. The second application on the second computing device and/or the CTI system can use the unique identifier to recover information stored in memory to recover the state of the co-browsing session when the connection was lost (e.g., terminated).

In some embodiments of the present disclosure, a concurrent voice communication can be initiated with a first user associated with the first computing device and a second user associated with the second computing device. The first user can include a consumer, user of, and/or owner of the first computing device, for instance. The second user can include an end-user, such as a CSR. The concurrent voice communication can, for instance, be provided by the CTI system. The concurrent voice communication can, for instance, be initiated prior to and/or after requesting, initiating, and/or establishing a co-browsing session.

The concurrent voice communication, in accordance with one or more embodiments of the present disclosure, can be provided over a voice over Internet Protocol (VoIP) connection, a wireless connection to the first computing device (e.g., mobile device), and/or a connection to the physical network between a first telephone device (e.g., the first computing device and/or telephone associated with the first computing device) operated by the first user and a second telephone device (e.g., the second computing device and/or telephone associated with the second computing device) operated by the second user. It will be appreciated that in some embodiments, the first computing device may not be able to support concurrent voice communication and data operation, necessitating an out of band voice communications session using connections between the first telephone device, the second telephone device, and the physical network.

At block 104, the method 100 can include receiving application display data from the first application on the first computing device using the second computing device. For instance, the application display data can include first application display data. The application display data can be received over a network (e.g., wireless network), for example. Application display data can, for example, include data related to a current display of a session of an application (e.g., display data of the user interface as seen by a user on the first computing device). The application display data can be sent, queried, and/or received in response to an established co-browsing session, for instance.

In some embodiments of the present disclosure, the application display data can be used to emulate a session of the first application in a second application on the second computing device. Emulating a session of the first application, as used herein, can include graphically reproducing the first application data as displayed on a first user interface of the first computing device on a second user interface and/or second display of the second computing device using the second application. Emulating a session of the first application can, for instance, be conducted within a co-browsing session with the first computing device and the second computing device.

In accordance with various embodiments of the present disclosure, the second application can verify an identity of a first user (e.g., user associated with the first computing device) prior to receiving the application display data. The first user can be verified, for example, by establishing a connection through a virtual private network to access a customer information system to access customer information related to the first user on the first computing device.

At block 106, the method 100 can include concurrently displaying data of the first application on a first user interface of the first computing device and on a second user interface of the second computing device using the received application display data in the co-browsing session. The application display data received from the first computing device can, for instance, be used to control the concurrent display of data of the first application on the first user interface and on the second user interface.

For instance, controlling concurrent display can include the second application controlling a revised concurrent display of the first application on the first user interface and the second user interface using the second application. For instance, the second application can use the received application display data and device configuration data (e.g., associated with the first computing device) to control a revised concurrent display. A revised concurrent display can include a new and/or different user interface of the first application than the original application display data and/or the session, for example. Thereby, a user (e.g., second user, end-user, and/or CSR) associated with the second computing device can change and/or navigate the first application (e.g., using first application display data and device configuration data received), and the navigation of the first application can be concurrently displayed on the first user interface and the second user interface.

Figure 2:
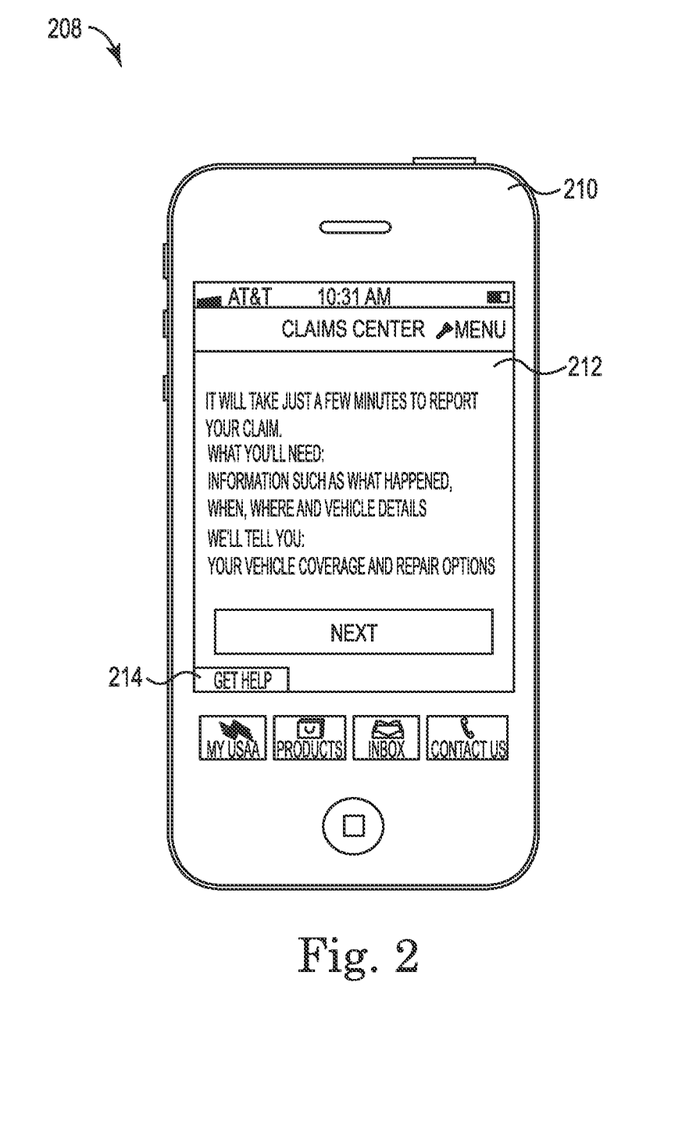
FIG. 2 illustrates an example display on a first user interface of first computing device prior to establishing a co-browsing session according to one or more embodiments of the present disclosure.

FIG. 2 illustrates an example of a display on a first user interface of a first computing device 208 prior to establishing a co-browsing session according to one or more embodiments of the present disclosure. As shown in FIG. 2, a first computing device 208 can include a mobile device. For instance, a first computing device 208 can include a body of a mobile device 210 and a first display 212. A display, as used herein, can include a screen and/or a touch screen, for example. A first display 212 can be used to display a first user interface of a first application on the first computing device 208.

In one or more embodiments of the present disclosure, a first user interface of the first application on the first display 212 can include an icon, button, and/or link that a user can select, click, and/or highlight to request, initiate, and/or establish a co-browsing session. The icon, button, and/or link can include a "Get Help" icon 214, as illustrated in the embodiment of FIG. 2. A "Get Help" icon 214 can be on one or more user interfaces associated with the first application, for example.

Figure 3A:
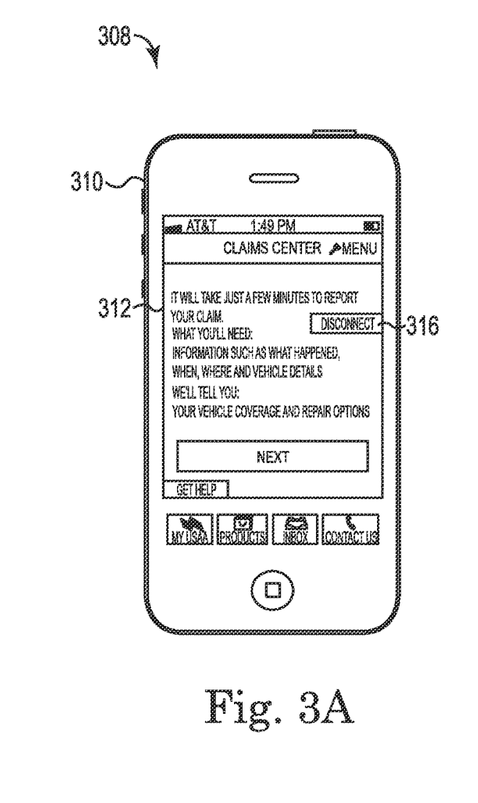
FIG. 3A illustrates an example display on a first user interface of a first computing device during a co-browsing session according to one or more embodiments of the present disclosure.

FIG. 3A illustrates an example display on a first user interface of a first computing device 308 during a co-browsing session according to one or more embodiments of the present disclosure. The first computing device 308 of FIG. 3A can, in various embodiments, include the first computing device 208 as illustrated in FIG. 2.

As shown in FIG. 3A, a first computing device 308 can include a mobile device. For instance, a first computing device 308 can include a body of a mobile device 310 and/or a first display 312. A first display 312 can be used to display a first user interface of a first application on the first computing device 308 during a co-browsing session.

The first application, in some embodiments, can provide an indication that the first application is in an established co-browsing session. For instance, the first user interface of the first application on the first computing device 308 can include an indication that the first application is in the established co-browsing session (e.g., not illustrated in FIG. 3A). Such indication can include, for instance, a banner, icon, and/or text stating a co-browsing session is occurring and/or a name of an end-user (e.g., CSR) on a second computing device (e.g., 318 of FIG. 3B) that is in a co-browsing session with the first computing device 308.

In one or more embodiments, a first user interface of the first application on the first display 312 during an established co-browsing session can include an icon, button, and/or link that a user can select, click, and/or highlight to disconnect from the co-browsing session. The icon, button, and/or link can include a "Disconnect" icon 316, as illustrated in the embodiment of FIG. 3A. A "Disconnect" icon 316 can be on one or more user interfaces associated with the first application, for example.

Figure 3B:
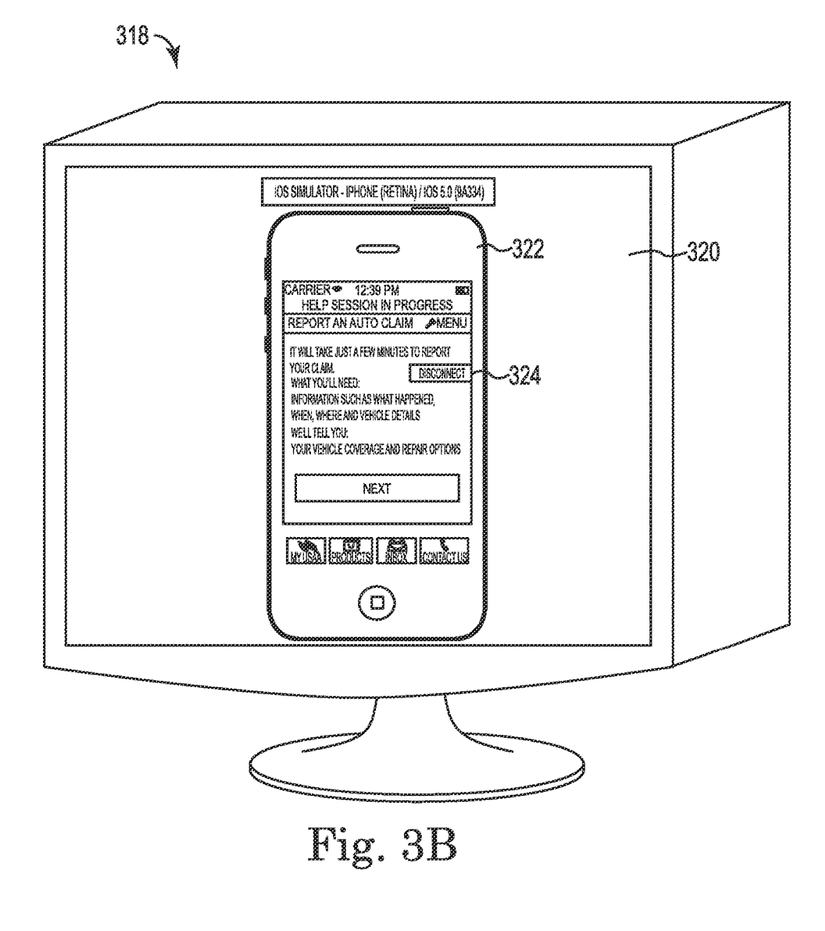
FIG. 3B illustrates an example display on a second user interface of a second computing device during a co-browsing session according to one or more embodiments of the present disclosure.

For instance, in response to a user indication, an established co-browsing session can end and/or terminate. User indication can, for example, include selecting, clicking, and/or highlighting the "Disconnect" icon 316. The user can include a first user associated with the first computing device 308. Thereby, the first application can be operable to disconnect the co-browsing session in response to an indication from a user on and/or associated with the first computing device FIG. 3B illustrates an example display on a second user interface of a second computing device 318 during a co-browsing session according to one or more embodiments of the present disclosure. The second computing device 318, as shown in FIG. 3B, can include a stationary device.

As shown in FIG. 3B, a second computing device 318 can include a second display 320. For instance, a second display 320 can be used to display a second user interface of a first application 322 on the second computing device 318 during a co-browsing session. The second user interface of the first application 322 on the second computing device 318 can include a concurrent display of the first user interface of the first application on the first computing device (e.g., the user interface on the first display 312 of the first computing device 308 in FIG. 3A). For example, a second user interface of the first application 322 on the second computing device 318 can include a representation of the first computing device (e.g., as illustrated by 308 in FIG. 3A) including the first user interface. However, embodiments of the present application are not so limited and can include a representation of the first user interface only. For example, the second user interface of the second computing device 322 may not include the body of the first computing device.

In some embodiments of the present disclosure, the second application can provide an indication that the second application is in an established co-browsing session. For example, the second user interface of the first application 322 on the second computing device 318 can include an indication that the second application is in the established co-browsing session (e.g., not illustrated in FIG. 3). Such indication can, for instance, include a banner, icon, and/or text stating a co-browsing session is occurring and/or a name of a user on the first computing device (e.g., 310 of FIG. 3A) that is in a co-browsing session with the second computing device 318.

In one or more embodiments of the present disclosure, a second user interface of the first application 322 on the second display 320 during an established co-browsing session can include an icon, button, and/or link that a user can select, click, and/or highlight to disconnect from the co-browsing session. The icon, button, and/or link can include a "Disconnect" icon 324, as illustrated in the embodiment of FIG. 3B.

For instance, in response to a user indication (e.g. selecting, clicking, and/or highlighting the "Disconnect" icon 324), an established co-browsing session can end and/or terminate. The user can include a second user and/or end-user associated with the second computing device 318. Thereby, the second application can be operable to disconnect the co-browsing session in response to an indication from a user on and/or associated with the second computing device.

Figure 4:
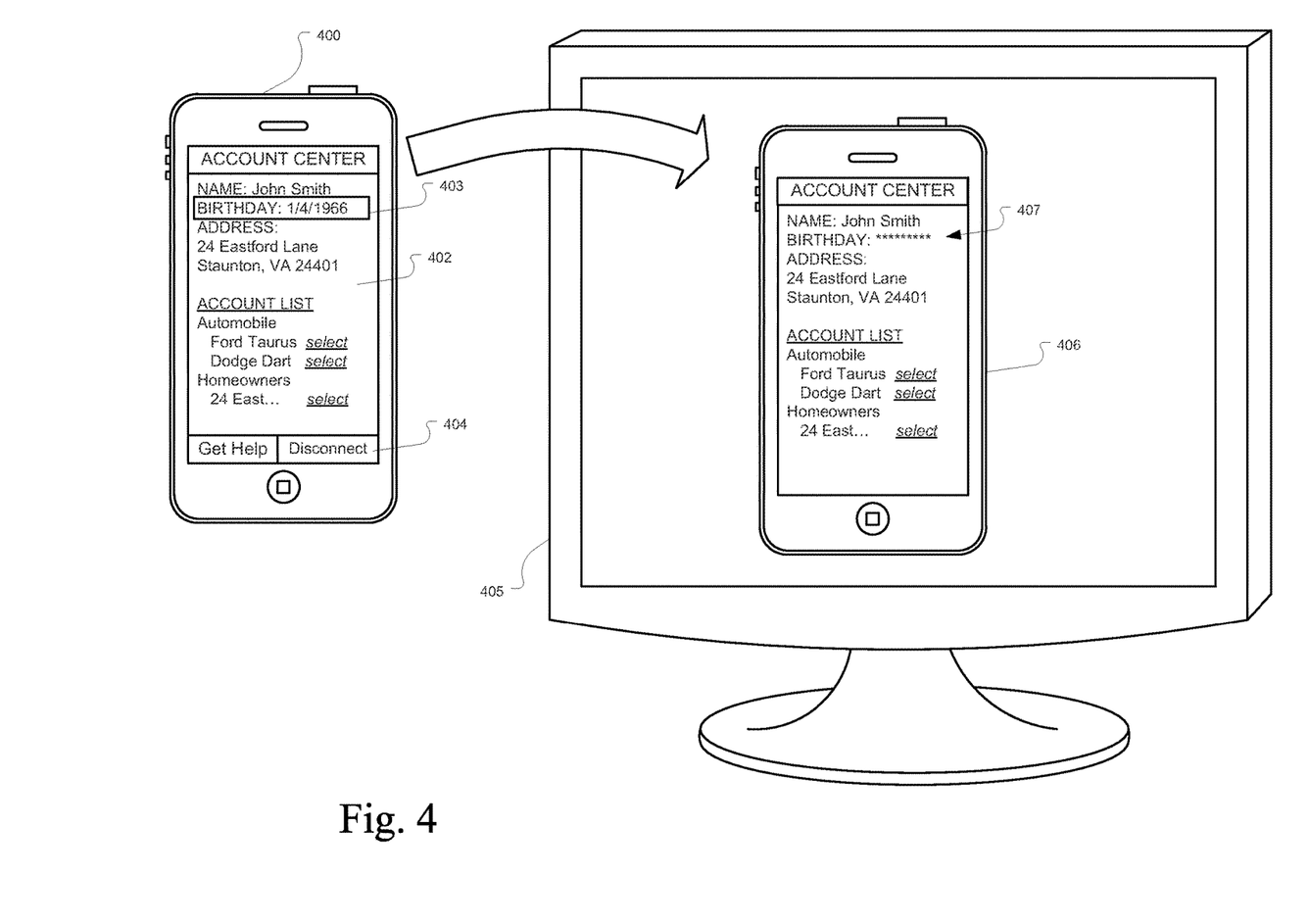
FIG. 4 illustrates an example display on a user interface of a computing device and a mobile device during a co-browsing session using image polling.

FIG. 4 illustrates an example display on a user interface of a computing device 405 and a mobile device 400 during a co-browsing session using image polling. In this example, the user interface 402 is displaying an account center application. The account center provides details about the user including the users name, birthdate, address, and list of current accounts. A user of a mobile device 400 contacts a customer service representative, for example, by selecting an icon or button present on the user interface of the mobile device 400.

In some implementations, when the user selects the "Get Help" button, communication is established with another computing device 405. For example, communication may be established with a customer service representative using any standard protocol, such as through a WebSockets communication session.

WebSockets is a protocol for providing full-duplex (two way) communication over a transmission control protocol (TCP) connection. Web socket communication can include a stream of bytes independent of any particular message structure. The WebSockets protocol was standardized by the IETF as RFC 6455 in 2011.

Communications between the mobile device and the computing device may be managed by a network component, such as a central processing unit communicating with and sending control signals to a network interface controller coupled to a network.

Establishing a connection between the mobile device 400 and the computing device 405 of the customer service representative may include mutual authentication. The user may be authenticated based on logging into the application on the mobile device 400. The customer service representative may be authenticated by the computing device 405. Alternatively, the user of the mobile device 400 and the customer service representative may be authenticated by trusted computer systems, for example, an authorization server. Establishing the connection may include sharing information about the authenticated user and customer service representative, including identity and security permissions, as discussed further below.

The mobile device 400 sends an image of the user interface 402 to the computing device 405 of the customer service representative. The image 406 can be displayed on the computing device 405. For example, a user interface component on the computing device 405 can cause the user interface to display the image 406. The image may reflect the orientation of the mobile device. For example, the mobile device 400 is currently positioned in a vertical orientation, if the user of the mobile device 400 were to turn the mobile device 400 on its side (that is, to a horizontal orientation) the image sent to the computing device 405 would reflect a horizontal orientation. The orientation of the mobile device may be determined by a sensor on the mobile device (for example, by a gyroscope integrated into the mobile device). The orientation of the mobile device can be used to determine the contents and positioning of the user interface 402 and the orientation of the image send to the computing device 405.

In some implementations, the mobile device 400 may send an updated image to the computing device 405 in response to a change in the user interface 402. For example, the mobile device 400 may send an update image if the user of the mobile device 400 navigates to a different screen, populates a field on the screen, or changes the orientation of the mobile device. Upon receiving an updated image, the computing device 405 may automatically refresh to display the new image or may notify the customer service representative that a new image is available. In some implementations, the computing device 405 may periodically poll the mobile device 400 requesting a new image if the user interface has changed. In other implementations, the mobile device 400 may determine when to send a new image to the computing device 405.

Sections of the user interface 402 may include information that is considered private, for example, the birthday 403 of the user. Prior to sending the image, private information can be masked by the mobile device 400, for example, the value of the birthday field is obfuscated so that the field 407 is filled with "*" characters when presented on the customer service representatives computing device. The field may be blurred, omitted, or otherwise rendered unintelligible before being sent to the customer service representative's computing device. In some implementations, user interfaces that contain private information may be restricted from being sent to the customer service representative.

In some implementations, a computer system (either the mobile device 400, the computing device 405 of the customer service representative, or some other computer system) may determine which fields may be included in the image sent to and displayed on the computing device 405. Determining the fields may be based on a white list of acceptable fields, a black list of unacceptable fields, or may be based on security characteristics of the individual who will receive the image. For example, an ordinary customer service representative may be prevented from seeing the birthday of the user and therefore the birthday field may not be sent. However, the manager of the customer service representative may be authorized to view birthdays, and therefore, an image sent to and displayed on the manager's computing device may include the birthday without obfuscation.

In implementations in which the obfuscation of private data is determined and performed by the mobile device 400, the mobile device may be made aware of the permissions of the user of the computing device 405. For example, the mobile device 405 may be provided with a while list of acceptable fields, or a blacklist of fields that should be obfuscated.

Figure 5:
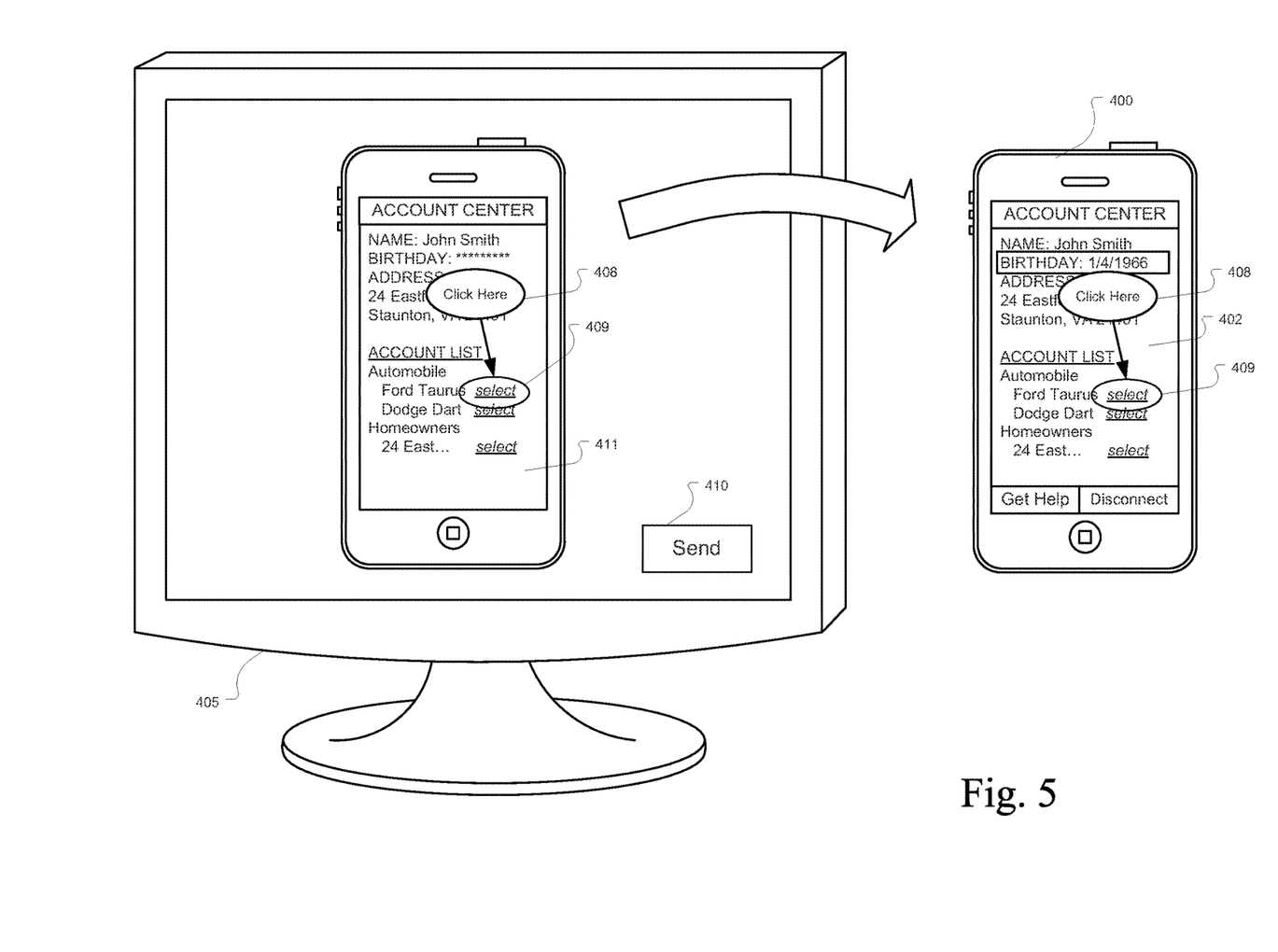
FIG. 5 illustrates an example display on a user interface of a computing device and a mobile device during a co-browsing session using image polling.

Referring to FIG. 5, the customer service representative may alter or annotate the image. For example, by drawing on or annotating parts of the image. In this example, the customer service representative has added a circle 409 around a "select" link and added a "click here" annotation 408 with an arrow pointing to the circle. The customer service representative may indicate to send the overlay image 411 to the mobile device 400, for example, the customer service representative may click on the "send" button 410.

The computing device 405 may receive input from a user of the computing device using a user input device such as a mouse, keyboard, stylus, touch screen, or any similar device. A processing component on the computing device 405 may combine with user input with the image to generate an overlay image. For example, the overlay image may include the annotation 408 and the circle 409, and a transparent background. In some implementations, the overlay image may not include the remaining portions of the image, such as the Name or Birthday fields; instead, the overlay image may include only the portions added by the customer service representative. In some implementations, the customer service representative can determine how much of the overlay image to send to the mobile device 405. For example, the customer service representative may determine whether to send the entire image or only the annotations.

The overlay image can be sent from the computing device 405 to the mobile device 400. In some implementations, the overlay image can be presented on the user device over the user interface. The user may be able to interact with the user interface 402 of the mobile device while the overlay image is presented. In other implementations, the overlay image includes the complete user interface and the annotations. The overlay image may be presented on the user interface of the mobile device 400. The user of the mobile device 400 may dismiss the image by clicking or tapping on the image. After which, the user may again interact with the user interface 402.

The annotations may also include a request that the user of the mobile device 400 change the orientation of the mobile device, for example, from a horizontal orientation to a vertical orientation. In some scenarios, the customer service representative may send an image in the desired orientation, for example, the image may display the user interface in a vertical orientation even if the mobile device is currently in the horizontal orientation. The image may encourage the user of the mobile device to change the orientation of the device. In some scenarios, the image sent from the customer service representative's computing device 405 to the mobile device 400 may not include the original image. For example, the computing device 405 may send an instruction manual or pamphlet which explains processes and procedures to the user of the mobile device.

Communications between the mobile device 400 and the computing device 405, including any and all images that were transmitted between the devices, may be stored in a persistent data store. The stored communications for training or auditing purposes.

Figure 6:
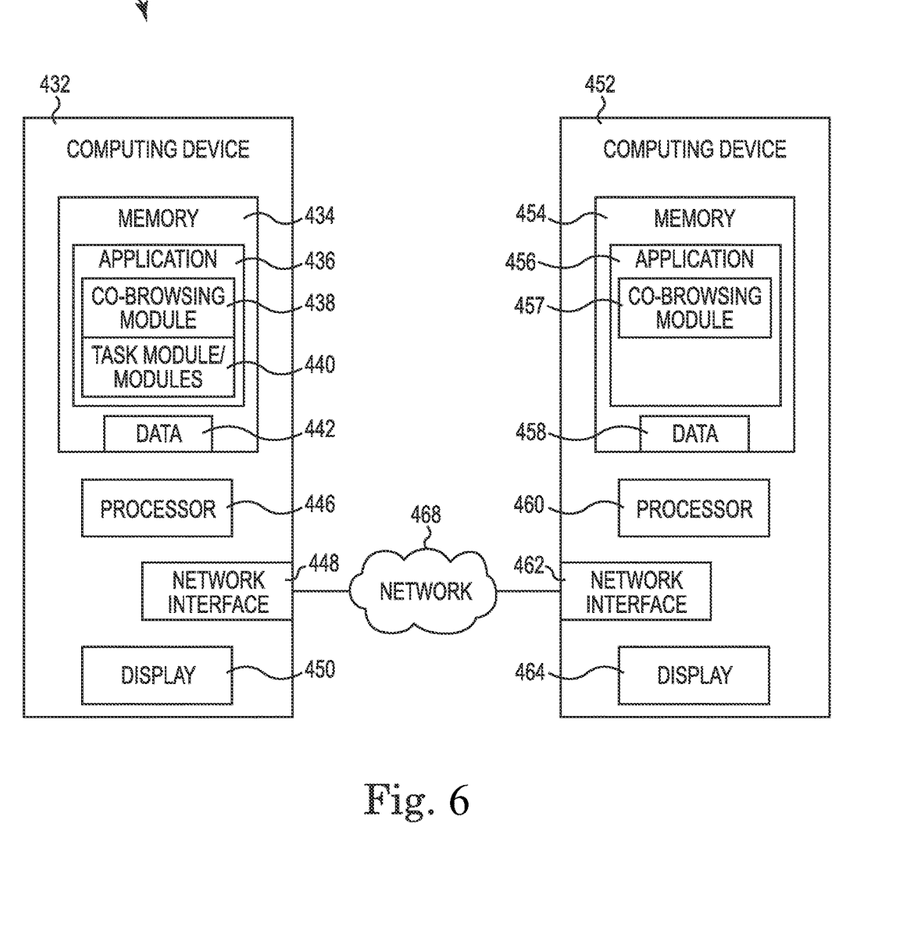
FIG. 6 illustrates a block diagram of an example system according to one or more embodiments of the present disclosure.

FIG. 6 illustrates a block diagram of an example system 430 that can be utilized with one or more embodiments of the present disclosure. The system 430 can include a first computing device 432 and a second computing device 452. A computing device can be, for example, a laptop computer, a desktop computer, and/or a mobile device (e.g., a mobile phone, a personal computing device, a PDA, etc.), among other types of computing devices.

The first computing device 432 can include a memory 434 and a processor 446 coupled to memory 434. Memory 434 can be any type of storage medium that can be accessed by processor 446 to perform various examples of the present disclosure (e.g., send first application display data, etc.). For example, memory 434 can be a non-transitory computing device readable medium having computing device readable instructions (e.g., computing device program instructions, machine readable instructions, computer readable instructions, etc.) and data 442 stored thereon. The computing device readable instructions are executable by processor 446 to perform various examples of the present disclosure. The data 442 can be used (e.g., analyzed by) the computing device readable instructions during their execution.

The second computing device 452 can include a memory 454 and a processor 460 coupled to the memory 454. Memory 454 can be any type of storage medium that can be accessed by processor 460 to perform various examples of the present disclosure (e.g., receive first application display data, emulate a session of the first application, etc.) For example, memory 454 can be a non-transitory computing device readable medium having computing device readable instructions (e.g., computing device program instructions, machine readable instructions, computer readable instructions, etc.) and data 458 stored thereon. The computing device readable instructions are executable by processor 460 to perform various examples of the present disclosure. The data 458 can be used (e.g., analyzed by) the computing device readable instructions during their execution.

Memory 434, 454 can be volatile or nonvolatile memory. Memory 434, 454 can also be removable (e.g., portable) memory, or non-removable (e.g., internal) memory. For example, memory 434, 454 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 434, 454 is illustrated as being located in computing device 432, 452, embodiments of the present disclosure are not so limited. For example, memory 434, 454 can, in addition to or alternatively, be located internal to another computing resource (e.g., enabling computer readable instructions to be downloaded over the Internet or another wired or wireless connection).

The first computing device 432 and/or second computing device 452 can include a network interface 448, 462. A network interface 448, 462 can connect the computing device 432, 452 to a network, such as network 468 illustrated in FIG. 4.

Network 468 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 468) can provide a communication system that directly or indirectly links two or more computers and/or peripheral devices and allows users to access resources on other computing resources (e.g., computing devices and/or data storage devices) and/or exchange messages with other users.

A network can allow users to share resources on their own systems with other network users and to access information on centrally located systems or on systems that are located at remote locations. For example, network 468 can tie a number of computing devices together to form a distributed control network (e.g., permit a computing device to connect to a repository of multimedia files hosted and/or uploaded to a central server by other computing devices accessing the network).

A network may provide connections to the Internet and/or to the networks of other entities (e.g., organizations, institutions, etc.). Users may interact with network-enabled computing device applications to make a network request, such as to get a file or print on a network printer. Applications may also communicate with network management software, which can interact with network hardware to transmit information between devices on the network.

The first computing device 432 and/or second computing device 452 can include a display (e.g. first display 450 and second display 464). A display 450, 464 can include, for example, a screen that can provide (e.g., display and/or present) information to a user of computing device 432, 452. For example, the display 450, 464 can be used to display a user interface.

Additionally, the first computing device 432 and/or second computing device 452 can receive information from a user of the computing device 432, 452 through an interaction with the user via display (e.g., first display 450 and second display 464). For instance, the first computing device 432 can receive input from the user (e.g., first user) via display 450 (e.g., a touch screen display or via another user input device such as a keyboard in response to interaction with items show on the display). The second computing device 452 can receive input from the user (e.g., second user) via display 464. A user can enter the input into the first computing device 432 and/or the second computing device 452 using a mouse and/or keyboard associated with the first computing device 432 and/or second computing device 452 (e.g., display 450, 464).

The first computing device 432 can include a first application 436. The first application 436 can, for instance, be stored in the memory 434 of the first computing device 432. The first application 436 can include a first co-browsing module 438, and a task module and/or multiple task modules 440. A module, as used herein, can include program instructions (e.g., computer readable instructions) to perform a particular act, task, and/or function when executed by a processor.

By way of illustration and not by way of limitation, the first co-browsing module 438 can include a number of instructions (e.g., a number of computer readable instructions) that can be executed by the processor 446 to perform or achieve the particular act or carry out the act of sending data to the second computing device 452. For instance, the first co-browsing module 438 can be executed by the processor 446 to send a request for a co-browsing session and send data to the second computing device 452. The data sent can, for instance, include application display data (e.g., first application display data) and/or device configuration data, among other data.

In some embodiments of the present disclosure, the first-co-browsing module 438 can include instructions that can be executed by the processor 446 to disconnect a co-browsing session in response to an indication from a user associated with the first computing device 432 (e.g., a first user). The indication can include a selection, click, and/or highlight of a disconnect icon, button, and/or other graphical representation on the first display 450 of the first computing device 432, for example.

The task module and/or multiple task modules 440, as used herein, can include instructions that can be executed by the processor 446 to perform one or more tasks of the first application 436. For instance, a task of the first application 436 can include one or more actions and/or outcomes of the first application 436. The one or more tasks of the first application can include tasks of the first application 436 other than the tasks of the first co-browsing module 438.

In accordance with one or more embodiments, the second computing device 452 can include a second application 456. The second application 456 can, for instance, be stored in the memory 454 of the second computing device. The second application 456 can include a second co-browsing module 457, for example.

The second co-browsing module 457 can include instructions that can be executed by the processor 460 to perform or achieve the particular act or carry out the act of establishing a co-browsing session, receiving data from the first computing device, and controlling concurrent display. For instance, the second co-browsing module 457 can include instructions that can be executed by the processor 460 to establish a co-browsing session with the first application 436 on the first computing device 432 in response to a request from the first application 436, receive first application display data from the first application 436 of the first computing device 432 over a network 468, emulate a session of the first application 436 from the received first application display data, and control concurrent display of data of the first application 436 on the first display 450 of the first computing device 432 and on the second display 464 of the second computing device 452.

In various embodiments of the present disclosure, the second co-browsing module 457 can include instructions that can be executed by the processor 460 to disconnect the co-browsing session in response to an indication from a user associated with the second computing device 452 (e.g., a second user). The indication can include a selection, click, and/or highlight of a disconnect icon, button, and/or other graphical representation on the second display 464 of the second computing device 452.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense. As used herein, "a" or "a number of" used in referring to a particular thing is intended refer to one or more such things.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, if provided, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim. Rather, inventive subject matter lies in less than all features of a single disclosed embodiment. Thus, the claims, if provided, are hereby incorporated into the Detailed Description, with each claim standing on its own as a separate embodiment.

What is claimed is:

1. A computer implemented method, comprising:
    establishing, by a computer system, full duplex communication session between a first application on a client device and a second application on the computer system, with the first application being configured to render a user interface that includes a plurality of fields;
    sending, by the computer system to the client device, a request for one or more first fields of the plurality of fields of the first application, with the one or more first fields determined, at least in part, based on a security permission of a user of the computer system, with the security permission specifying that the user of the computer system has access to view only the one or more first fields;
    receiving, by the computer system from the client device, rendering data generated on the client device, with the rendering data being configured to render, on a display device of the computer system, an image of the user interface of the first application on the client device, wherein the image of the user interface displays (i) the one or more first fields specified in the request and one or more values of the respective one or more first fields, and (ii) a second field in the plurality of the fields, with a value of the second field being obfuscated in accordance with the security permission of the user;
    displaying, based on the received rendering data, the image of the user interface on a user interface of the computer system;
    generating, by the computer system, overlay image data that when rendered displays one or more annotations as an overlay to the user interface of the first application on the client device; and
    sending the overlay image data to the client device to cause the client device to display the one or more annotations as the overlay to the user interface of the first application.

2. The method of claim 1, further comprising:
    polling the client device to request an updated image of the user interface of the first application on the client device.

3. The method of claim 2, further comprising:
    receiving, by the computer system from the client device, additional rendering data generated on the client device, with the additional rendering data being configured to tender on the display device of the computer system an updated image of the user interface of the first application on the client device in response to a change in the user interface.

4. The method of claim 1, wherein establishing the full duplex communication comprises establishing a websockets session.

5. The method of claim 1, further comprising:
    receiving, by the computer system and from the client device, additional rendering data generated on the client device, with the rendering data being configured to render on the display device of the computer system an updated image of the user interface, wherein the additional rendering data is generated in response to a change in an orientation of the client device.

6. A non-transitory computer storage medium encoded with computer program instructions that when executed by a computer system cause the computer system to perform operations comprising:
    establishing, by the computer system, full duplex communication session between a first application on a client device and a second application on the computer system, with the first application being configured to render a user interface that includes a plurality of fields;
    sending, by the computer system to the client device, a request for one or more first fields of the plurality of fields of the first application, with the one or more first fields determined, at least in part, based on a security permission of a user of the computer system, with the security permission specifying that the user of the computer system has access to view only the one or more first fields;
    receiving, by the computer system from the client device, rendering data generated on the client device, with the rendering data being configured to render on a display device of the computer system an image of the user interface of the first application on the client device, wherein the image of the user interface displays (i) the one or more first fields specified in the request and one or more values of the respective one or more first fields, and (ii) a second field in the plurality of the fields, with a value of the second field being obfuscated in accordance with the security permission of the user;

displaying, based on the received rendering data, the image of the user interface on a user interface of the computer system;

generating, by the computer system, overlay image data that when rendered displays one or more annotations as an overlay to the user interface of the first application on the client device; and sending the overlay image data to the client device to cause the client device to display the one or more annotations as the overlay to the user interface of the first application.

7. The medium of claim 6, further comprising:
polling the client device to request an updated image of the user interface of the first application on the client device.

8. The medium of claim 7, further comprising:
receiving, by the computer system from the client device, additional rendering data generated on the client device, with the additional rendering data being configured to tender on the display device of the computer system an updated image of the user interface of the first application on the client device in response to a change in the user interface.

9. The medium of claim 6, wherein establishing the full duplex communication comprises establishing a websockets session.

10. The medium of claim 6, further comprising:
receiving, by the computer system and from the client device, additional rendering data generated on the client device, with the rendering data being configured to render on the display device of the computer system an updated image of the user interface, wherein the additional rendering data is generated in response to a change in an orientation of the client device.

11. A system comprising:
a computer system having one or more computers and one or more storage devices storing instructions that are operable, when executed by the one or more computers, to cause the one or more computers to:

establish full duplex communication session between a first application on a client device and a second application on the computer system, with the first application being configured to render a user interface that includes a plurality of fields;

send, by the one or more computers to the client device, a request for one or more first fields of the plurality of the first application, with the one or more first fields determined, at least in part, based on a security permission of a user of the one or more computers, with the security permission specifying that the user of the computer system has access to view only the one or more first fields;

generate, by the computer system from the client device, rendering data generated on the client device, with the rendering data being configured to render on a display device of the one or more computers an image of the user interface of the first application on the client device, wherein the image of the user interface displays (i) the one or more first fields specified in the request and one or more values of the respective one or more first fields, and (ii) a second field in the plurality of the fields, with a value of the second field being obfuscated in accordance with the security permission of the user;

display based on the received rendering data, the image of the user interface image on a user interface of the computer system, the user interface image displayed in the second orientation;

generate overlay image data that when rendered displays one or more annotations as an overlay to the user interface of the first application on the client device; and send the overlay image data to the client device to cause the client device to display the one or more annotations as the overlay to the user interface of the first application.

12. The system of claim 11, wherein the instructions are further operable, when executed by the one or more computers, to cause the one or more computers to:
poll the client device to request an updated image of the user interface of the first application on the client device.

13. The system of claim 12, wherein the instructions are further operable, when executed by the one or more computers, to cause the one or more computers to:
receive, from the client device, additional rendering data generated on the client device, with the additional rendering data being configured to tender on the display device of the computer system an updated image of the user interface of the first application on the client device in response to a change in the user interface.

14. The system of claim 11, wherein establishing the full duplex communication comprises establishing a websockets session.

15. The system of claim 11, further comprising:
receiving, by the computer system and from the client device, additional rendering data generated on the client device, with the rendering data being configured to render on the display device of the computer system an updated image of the user interface, wherein the additional rendering data is generated in response to a change in an orientation of the client device.

16. The method of claim 1, further comprising causing the one or more annotations to be displayed on the client device until a predetermined action is taken by a user of the client device.

17. The method of claim 1, wherein the image of the user interface is in a first orientation determined based on an orientation of the client device and one or more annotations are in a second orientation determined by the user of the computer system.

* * * * *